United States Patent
Burnett et al.

(10) Patent No.: US 12,512,748 B2
(45) Date of Patent: Dec. 30, 2025

(54) ELECTRICAL ASSEMBLY

(71) Applicant: General Electric Technology GmbH, Baden (CH)

(72) Inventors: Alistair John Burnett, Stafford (GB); Neil Stuart Spibey, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 997 days.

(21) Appl. No.: 17/668,072

(22) Filed: Feb. 9, 2022

(65) Prior Publication Data
US 2022/0271648 A1    Aug. 25, 2022

(30) Foreign Application Priority Data
Feb. 9, 2021 (EP) ..................................... 21275015

(51) Int. Cl.
*H02M 1/32* (2007.01)
*H02M 1/00* (2006.01)

(52) U.S. Cl.
CPC ......... *H02M 1/322* (2021.05); *H02M 1/0077* (2021.05)

(58) Field of Classification Search
CPC .................................................... H02M 1/322
USPC ........................................................ 320/166
See application file for complete search history.

(56) References Cited

U.S. PATENT DOCUMENTS

| | | | |
|---|---|---|---|
| 2018/0316163 A1 | 11/2018 | Jung | |
| 2023/0353041 A1* | 11/2023 | Han | H01R 4/66 |

FOREIGN PATENT DOCUMENTS

| | | |
|---|---|---|
| EP | 3439162 A1 | 2/2019 |
| JP | H06165494 A | 6/1994 |
| JP | H06343267 A | 12/1994 |
| KR | 101288679 B1 | 7/2013 |
| NO | 2015/090367 A1 | 6/2015 |
| WO | 2015172827 A1 | 11/2015 |
| WO | 2018/041370 A1 | 3/2018 |
| WO | 2020/173567 A1 | 9/2020 |

OTHER PUBLICATIONS

European Search Report and Opinion issued in 21275015.2, dated Jul. 7, 2021, 6 pages.

* cited by examiner

*Primary Examiner* — Eric D Lee
(74) *Attorney, Agent, or Firm* — Eversheds Sutherland (US) LLP

(57) ABSTRACT

Embodiments of the disclosure can include various electrical assemblies. In one embodiment, an electrical assembly can include
 a module including at least one module switching element and an energy storage device, the or each module switching element and the energy storage device in the module arranged to be combinable to selectively provide a voltage source; and
 a shorting device directly connected to first and second terminals of the energy storage device, the shorting device including a first shorting switching element configured to be switchable between: a first switching state to isolate the first and second terminals from each other; and a second switching state to electrically connect the first and second terminals to short the energy storage device.

14 Claims, 6 Drawing Sheets

ELECTRICAL ASSEMBLY

CROSS-REFERENCE TO RELATED APPLICATION

This application claims the priority benefit of European Application No. 21275015.2, filed Feb. 9, 2021, which is incorporated by reference in its entirety.

This invention relates to an electrical assembly, preferably for use in medium voltage and high voltage power applications.

An electrical equipment may include a grounding connection that is operable to selectively connect the electrical equipment to ground. This permits the electrical equipment to be discharged to ground potential, thus ensuring the safety of a nearby user or operator that is required to approach or handle the electrical equipment.

According to an aspect of the invention, there is provided an electrical assembly comprising:
- a module including at least one module switching element and an energy storage device, the or each module switching element and the energy storage device in the module arranged to be combinable to selectively provide a voltage source; and
- a shorting device directly connected to first and second terminals of the energy storage device, the shorting device including a first shorting switching element configured to be switchable between: a first switching state to isolate the first and second terminals from each other; and a second switching state to electrically connect the first and second terminals to short the energy storage device.

For the purposes of this specification, the direct connection between two electrical or electronic components is intended to mean that there is no intermediate functional electrical or electronic component between the two electrical or electronic components. The functional electrical or electronic component may be an active functional electrical or electronic component (such as a switching element) or a passive functional electrical or electronic component (such as a resistor or an inductor). It will be understood that a functional electrical or electronic component is intended to exclude electrical conductors (such as wires and cables) that only fulfil the purpose of conducting electricity.

The direct connection of the shorting device to the terminals of the energy storage device provides the energy storage device with a short circuit path that is selectively formable independently of the rest of the module structure. The provision of the first and second switching states of the first shorting switching element to enable the selective formation of the short circuit path means that the shorting device does not interfere with the normal operation of the module to selectively provide a voltage source and at the same time permits rapid and reliable short circuiting of the energy storage device when it is required to be in a discharged state.

The formation of the short circuit path enables the short circuiting of the energy storage device to facilitate the discharging process to ensure that there is no storage or build-up of charge in the energy storage device when it is required to be in a discharged state. This includes preventing the energy storage device from being charged by a current flowing through the electrical assembly (such as a discharge current from another discharging device elsewhere in the electrical assembly), which in turn avoids the occurrence of an undetectable new risk in the form of a recharged energy storage device that was previously verified as being discharged. The invention therefore provides an assurance of a complete discharge of the energy storage device, which eases and speeds up the verification of the absence of voltage on the terminals of the energy storage device. This improves the electrical safety and speed of the process of accessing the electrical assembly to, for example, carry out maintenance or repair.

Configuring the short circuit path to be selectively formable independently of the rest of the module structure ensures that the shorting device is always capable of physically accessing the terminals of the energy storage device, even when there is a physical or electrical fault in the rest of the module structure. As a result, verification of the absence of voltage on the terminals of the energy storage device is always possible irrespective of whether the energy storage device is electrically connected to or disconnected from the rest of the module structure.

Furthermore, the direct connection of the shorting device to the terminals of the energy storage device allows visual verification of the connection of the short circuit path to the terminals of the energy storage device at a safe electrical distance from the electrical assembly. For example, the shorting device may be unenclosed to enable straightforward visual verification of the electrical continuity of the short circuit path across the terminals of the energy storage device.

In contrast, a shorting device is conventionally connected to the terminals at the front end of the module so that the connection of any formed short circuit path to the terminals of the energy storage device is formed inside the module structure. Consequently a physical or electrical fault in the module structure may result in an electrical disconnection between the shorting device and the terminals of the energy storage device. Furthermore, since the connection of any formed short circuit path to the terminals of the energy storage device is formed inside the module structure, it is not straightforward to visually verify the electrical continuity of the short circuit path across the terminals of the energy storage device. This removes any assurance of a complete discharge of the energy storage device and thereby creating a risk of electric shock to the user, thus requiring the creation of complex safety procedures to mitigate these risks and thereby delaying access to the electrical assembly.

The module of the electrical assembly of the invention may include a plurality of energy storage devices. The or each module switching element and each energy storage device in such a module may be arranged to be combinable to selectively provide a voltage source.

The electrical assembly may include a plurality of modules.

In embodiments of the invention in which the module includes a plurality of energy storage devices or in which the electrical assembly includes a plurality of modules, the shorting device may include a plurality of first shorting switching elements, each of which is connected with a respective one of the plurality of energy storage devices. This enables the reliable short circuiting of each energy storage device, thus avoiding the situation where one or more individual energy storage devices remains charged or is recharged. This not only reduces the risk of an occurrence of electric shock associated with having a plurality of energy storage devices charged so that the electrical assembly presents an overall voltage of 10's or 100's of kV but also permits a user to incrementally approach the electrical assembly to carry out various steps in the discharging and verification of absence of voltage procedure.

In preferred embodiments of the invention, the or each first shorting switching element may be directly connected to the first and second terminals of the or the respective energy storage device.

In further embodiments of the invention, one of the first and second terminals of the energy storage device may be electrically connectable to a grounding terminal for electrical connection to ground.

The module may include a chassis that supports or houses the energy storage device. One of the first and second terminals of the energy storage device may be electrically connected to the chassis.

In embodiments of the invention employing a plurality of energy storage devices in the same module, the chassis may support or house the energy storage devices, and one of the first and second terminals of each of the plurality of energy storage devices may be electrically connected to the chassis.

The chassis provides a known local potential.

In further embodiments of the invention, the electrical assembly may include a structural element configured to support and/or enclose the module. The shorting device may include a second shorting switching element configured to connect a selected one of the first and second terminals of the energy storage device to the structural element. The second shorting switching element may be configured to be switchable between: a first switching state to electrically isolate the selected terminal of the energy storage device from the structural element; and a second switching state to electrically connect the selected terminal of the energy storage device to the structural element.

The provision of the second shorting switching element provides a reliable means of connecting the energy storage device to a known potential that is defined by the structural element. For example, if the structural element is connected to ground, configuring the second shorting switching element to its second switching state connects the energy storage device to earth potential.

The structural element may have any form or shape so long as it remains capable of structurally supporting and/or enclosing the module or, in some embodiments, a plurality of modules. For example, the structural element may be or may include a frame, a rack, a shelf or a cage.

In further embodiments of the invention employing the use of a plurality of modules, the shorting device may include a third shorting switching element configured to connect a selected one of the first and second terminals of the energy storage device of one of the plurality of modules to a selected one of the first and second terminals of the energy storage device of another of the plurality of modules. The third shorting switching element may be configured to be switchable between: a first switching state to electrically isolate the selected terminals of the energy storage devices of the plurality of modules; and a second switching state to electrically connect the selected terminals of the energy storage devices of the plurality of modules. In such embodiments, the third shorting switching element may be configured to connect the chassis of different modules.

The provision of the third shorting switching element to interconnect energy storage devices of different modules provides a convenient means of connecting the energy storage devices of the different modules to a known potential, e.g. earth potential, irrespective of the physical arrangement of the multiple modules (such as a series stack of modules). For example, the third shorting switching element may be used to interconnect energy storage devices of different modules and one of the energy storage devices may be connected to the known potential, which is structurally simpler than providing a separate connection of each energy storage device to the known potential.

In embodiments of the invention, the shorting device may include a support longitudinal member, the or each shorting switching element including a switch contact member, the or each switch contact member arranged in or on the support longitudinal member. The support longitudinal member may be configured to be slidable to move the or each switch contact member to switch the or each shorting switching element between its first and second switching states.

The inclusion of the support longitudinal member in the shorting device of the invention provides a way of switching the or each shorting switching element between its first and second switching states in a manner that imparts at least the following benefits.

The arrangement of the or each switch contact member in or on the support longitudinal member makes it straightforward to adapt its sliding motion to ensure sufficient electrical isolation between the switch contact member and a corresponding electrical terminal when it is required to configure the or each shorting switching element in its first switching state, and readily enable the movement of the or each switch contact member to come into contact with the corresponding electrical terminal when it is required to configure the or each shorting switching element in its second switching state. This results in a robust mechanism for operating the shorting device to ensure a complete discharge of the or each energy storage device without causing a dangerous failure of the electrical assembly.

In addition, the provision of the support longitudinal member sliding between different positions to switch the or each shorting switching element between its first and second switching states provides a highly visible and accurate representation of the status of the open or closed position of the or each switch contact member. This in turn enables an operator to visually check from a safe distance whether the or each short circuit path is safely formed before approaching the electrical assembly.

Also, by arranging the or each switch contact member to be in or on the support longitudinal member, it becomes straightforward to remove the shorting device from the electrical assembly prior to maintenance or repair because the or each switch contact member is attached to the support longitudinal member. For the same reason, it is also straightforward to reinstall the shorting device on the electrical assembly after completing the maintenance or repair. This advantageously reduces the overall time spent by the electrical assembly in an offline mode, which not only reduces inconvenience to an end user but also improves the productivity of the associated electrical application.

In further embodiments of the invention employing the use of a plurality of shorting switching elements, the arrangement of multiple switch contact members in or on the same support longitudinal member enables a single sliding motion of the support longitudinal member to facilitate the simultaneous shorting and/or earthing of multiple energy storage devices, which is more time-efficient in comparison to shorting and/or earthing the energy storage devices one at a time.

In still further embodiments of the invention employing the use of a plurality of shorting switching elements, the shorting device may include a plurality of support longitudinal members. Each switch contact member may be arranged in or on a respective one of the support longitudinal members. Each support longitudinal member may be configured to be slidable to move the corresponding switch contact member to switch the corresponding shorting switching element between its first and second switching states. It will be understood that each of the plurality of support longitudinal members may have a single switch contact member or multiple switch contact members arranged therein or thereon.

The arrangement of one or more switch contact members in or on each of the plurality of support longitudinal members enables separate or concurrent sliding motions of the support longitudinal members to facilitate the shorting and/or earthing of multiple energy storage devices. Furthermore, the use of multiple support longitudinal members enables the shorting device to be used with various constructions and layouts of the multiple energy storage devices, e.g. the terminals of the energy storage devices being positioned at different heights, the energy storage devices being arranged at different distances relative to each other, the energy storage devices being arranged along a straight line or in a staggered fashion.

The or each shorting switching element may be, but is not limited to, a mechanical, electrical, electronic or vacuum switching element.

In embodiments of the invention, the or each module switching element may be arranged in a switching block that is removably disengageable from the module. The physical removal of the switching block from the module leaves the energy storage device in an electrical floating state with respect to the rest of the module structure.

The direct connection of the shorting device to the terminals of the energy storage device(s) permits the physical removal of the switching block from the module without interfering with the shorting and/or earthing of the energy storage device(s). This is because the shorting device remains intact and connected to the terminals of the energy storage device(s) even when the switching block is removed from the module.

In contrast, when a shorting device is conventionally connected to the terminals at the front end of the module so that the connection of any formed short circuit path to the terminals of the energy storage device is formed inside the module structure, removal of the switching block from the module results in an electrical disconnection between the shorting device and the energy storage device(s), thus interfering with the shorting and/or earthing of the energy storage device(s).

The shorting device may be accessible and/or visible outwardly of the module. Preferably the or each shorting switching element may be accessible and/or visible outwardly of the module. This enables an operator to visually verify the electrical continuity of the short circuit path across the terminals of the energy storage device from a safe distance from the electrical assembly.

The electrical assembly may be incorporated into a range of electrical apparatus. For example, a switching valve may comprise an electrical assembly according to any one of the embodiments described hereinabove, or a voltage source converter may comprise an electrical assembly according to any one of the embodiments described hereinabove. The electrical assembly of the invention may be applied to any other apparatus that comprises at least one module including at least one module switching element and at least one energy storage device, the or each module switching element and the or each energy storage device in the or each module arranged to be combinable to selectively provide a voltage source. Examples of such an apparatus include a static synchronous compensator, a dynamic braking resistor and an electrical interruption device (such as an isolator, a disconnector or a circuit breaker).

The or each module may vary in configuration, non-limiting examples of which are set out as follows.

In a first exemplary configuration of a module, the or each module switching element and the or each energy storage device in the module may be arranged to be combinable to selectively provide a unidirectional voltage source. For example, the module may include a pair of module switching elements connected in parallel with an energy storage device in a half-bridge arrangement to define a 2-quadrant unipolar module that can provide zero or positive voltage and can conduct current in two directions.

In a second exemplary configuration of a module, the or each module switching element and the or each energy storage device in the module may be arranged to be combinable to selectively provide a bidirectional voltage source. For example, the module may include two pairs of module switching elements connected in parallel with an energy storage device in a full-bridge arrangement to define a 4-quadrant bipolar module that can provide negative, zero or positive voltage and can conduct current in two directions.

A plurality of modules may be connected in series to define a chain-link converter. The structure of the chain-link converter permits build-up of a combined voltage across the chain-link converter, which is higher than the voltage available from each of its individual modules, via the insertion of the energy storage devices of multiple modules, each providing its own voltage, into the chain-link converter. In this manner switching of the or each module switching element in each module causes the chain-link converter to provide a stepped variable voltage source, which permits the generation of a voltage waveform across the chain-link converter using a step-wise approximation. As such the chain-link converter is capable of providing a wide range of complex voltage waveforms.

At least one switching element may be a wide-bandgap material based switching element or a silicon semiconductor based switching element. Examples of wide-bandgap materials include, but are not limited to, silicon carbide, boron nitride, gallium nitride and aluminium nitride.

At least one switching element may include at least one self-commutated switching device. The or each self-commutated switching device may be an insulated gate bipolar transistor (IGBT), a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated switching device. The number of switching devices in each switching element may vary depending on the required voltage and current ratings of that switching element.

At least one switching element may further include a passive current check element that is connected in anti-parallel with the or each switching device. The or each passive current check element may include at least one passive current check device. The or each passive current check device may be any device that is capable of limiting current flow in only one direction, e.g. a diode. The number of passive current check devices in each passive current check element may vary depending on the required voltage and current ratings of that passive current check element.

Each energy storage device may be any device that is capable of storing and releasing energy to selectively provide a voltage, e.g. a capacitor, fuel cell or battery.

The configuration of the voltage source converter may vary depending on its operating requirements.

In embodiments of the invention, the voltage source converter may include at least one converter limb and a plurality of modules, the or each converter limb comprising an electrical assembly according to any one of the embodiments described hereinabove, the or each converter limb extending between a pair of first terminals defining first and second DC terminals, the or each converter limb including first and second limb portions separated by a second terminal defining an AC terminal, each limb portion including at least one of the modules.

In a preferred embodiment of the invention, the voltage source converter includes three converter limbs, each of which is connectable via the respective AC terminal to a respective phase of a three-phase AC network. It will be appreciated that the voltage source converter may include a different number of converter limbs, each of which is connectable via the respective AC terminal to a respective phase of an AC network with the corresponding number of phases.

It will be appreciated that the use of the terms "first" and "second", and the like, in this patent specification is merely intended to help distinguish between similar features (e.g. the first, second and third shorting switching elements), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

A preferred embodiment of the invention will now be described, by way of a non-limiting example, with reference to the accompanying drawings in which:

FIG. 1 shows a voltage source converter according to an embodiment of the invention;

FIGS. 2 and 3 respectively show exemplary half-bridge and full-bridge chain-link module configurations of a module of the voltage source converter of FIG. 1;

The figures are not necessarily to scale, and certain features and certain views of the figures may be shown exaggerated in scale or in schematic form in the interests of clarity and conciseness.

The following embodiment of the invention is used primarily in HVDC applications, but it will be appreciated that the following embodiment of the invention is applicable mutatis mutandis to other applications operating at different voltage levels. The following embodiment of the invention is described with reference to an AC-DC voltage source converter, but it will be appreciated that the following embodiment of the invention is applicable mutatis mutandis to other types of converters including AC-AC converters and DC-DC converters.

Figure 1:
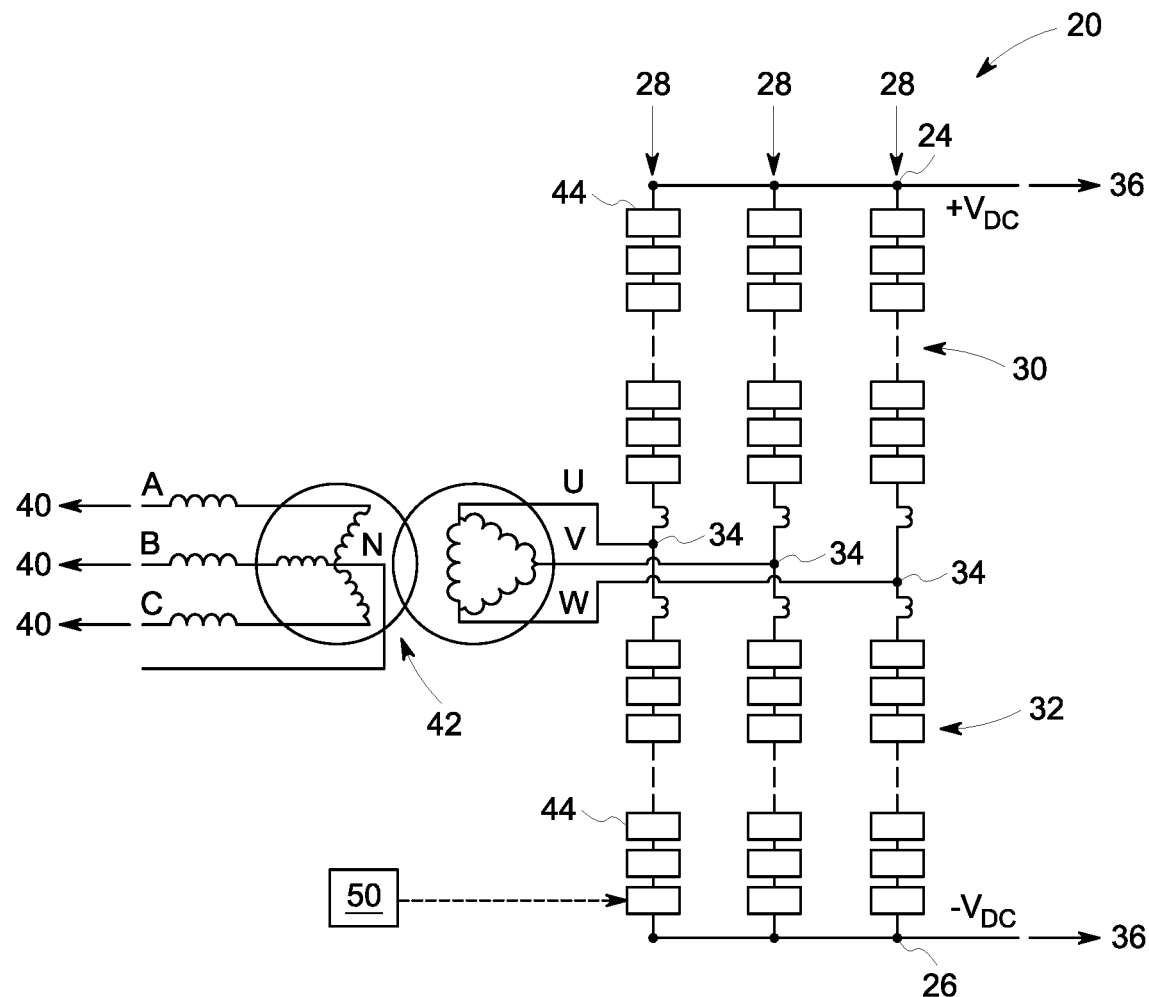

A voltage source converter according to an embodiment of the invention is shown in FIG. 1 and is designated generally by the reference numeral 20.

The voltage source converter 20 includes first and second DC terminals 24,26 and a plurality of converter limbs 28. Each converter limb 28 extends between the first and second DC terminals 24,26 and includes first and second limb portions 30,32 separated by a respective AC terminal 34. In each converter limb 28, the first limb portion 30 extends between the first DC terminal 24 and the AC terminal 34, while the second limb portion 32 extends between the second DC terminal 26 and the AC terminal 34.

In use, the first and second DC terminals 24,26 of the voltage source converter 20 are respectively connected to a DC network 36. In use, the AC terminal 34 of each converter limb 28 of the voltage source converter 20 is connected to a respective AC phase of a three-phase AC network 40 via a star-delta transformer arrangement 42. The three-phase AC network 40 is an AC power grid 40. It is envisaged that, in other embodiments of the invention, the transformer arrangement may be a different type of transformer arrangement, such as a star-star transformer arrangement.

Each limb portion 30,32 includes a switching valve, which includes a chain-link converter that is defined by a plurality of series-connected modules 44.

Each module 44 may vary in topology, examples of which are described as follows.

Figure 2:
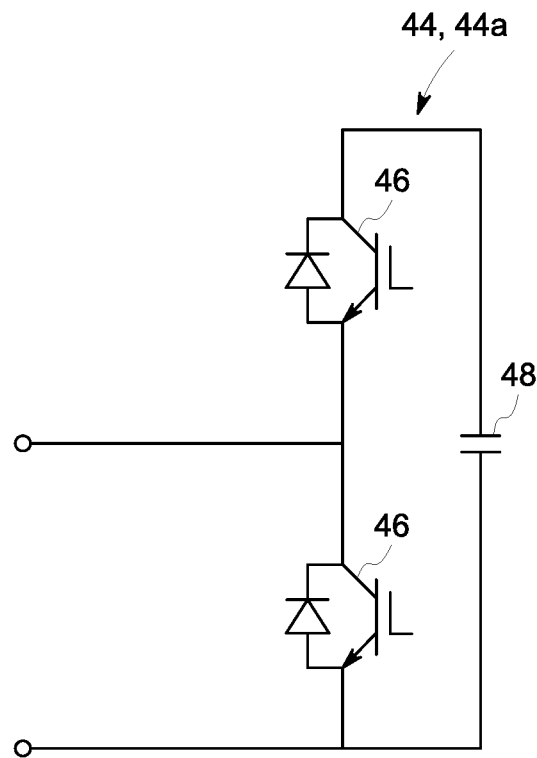

FIG. 2 shows schematically the structure of an exemplary module 44 in the form of a half-bridge module 44a. The half-bridge module 44a includes a pair of module switching elements 46 and a capacitor 48. Each module switching element 46 of the half-bridge module 44a is in the form of an IGBT which is connected in parallel with an anti-parallel diode. The pair of module switching elements 46 are connected in parallel with the capacitor 48 in a half-bridge arrangement to define a 2-quadrant unipolar module 44a that can provide zero or positive voltage and can conduct current in both directions.

Figure 3:
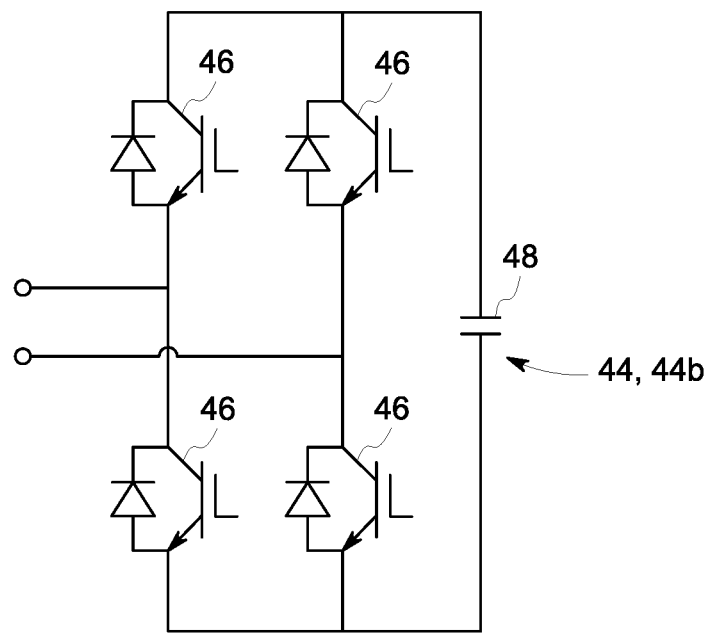

FIG. 3 shows schematically the structure of an exemplary module 44 in the form of a full-bridge module 44b. The full-bridge module 44b includes two pairs of module switching elements 46 and a capacitor 48. Each module switching element 46 of the full-bridge module 44b is in the form of an IGBT which is connected in parallel with an anti-parallel diode. The pairs of module switching elements 46 are connected in parallel with the capacitor 48 in a full-bridge arrangement to define a 4-quadrant bipolar module 44b that can provide negative, zero or positive voltage and can conduct current in both directions.

The structure of a given module 44 includes the arrangement and type of module switching elements 46 and energy storage device 48 used in the given module 44. It will be appreciated that it is not essential for all of the modules 44 to have the same module structure. For example, the plurality of modules 44 may comprise a combination of half-bridge modules 44a and full-bridge modules 44b.

It is envisaged that, in other embodiments of the invention, each module switching element 46 of each module 44 may be replaced by a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated semiconductor device. It is also envisaged that, in other embodiments of the invention, each diode may be replaced by a plurality of series-connected diodes.

The capacitor 48 of each module 44 is selectively bypassed or inserted into the corresponding chain-link converter by changing the states of the module switching elements 46. This selectively directs current through the capacitor 48 or causes current to bypass the capacitor 48, so that the module 44 provides a zero or non-zero voltage.

The capacitor 48 of the module 44 is bypassed when the module switching elements 46 in the module 44 are configured to form a short circuit in the module 44, whereby the short circuit bypasses the capacitor 48. This causes current in the corresponding chain-link converter to pass through the short circuit and bypass the capacitor 48, and so the module 44 provides a zero voltage, i.e. the module 44 is configured in a bypassed mode.

The capacitor 48 of the module 44 is inserted into the corresponding chain-link converter when the module switching elements 46 in the module 44 are configured to allow the current in the corresponding chain-link converter to flow into and out of the capacitor 48.

The capacitor 48 then charges or discharges its stored energy so as to provide a non-zero voltage, i.e. the module 44 is configured in a non-bypassed mode.

In this manner the module switching elements 46 in each module 44 are switchable to control flow of current through the corresponding capacitor 48.

It is possible to build up a combined voltage across each chain-link converter, which is higher than the voltage available from each of its individual modules 44, via the insertion of the capacitors of multiple modules 44, each providing its own voltage, into each chain-link converter. In this manner switching of the module switching elements 46 in each module 44 causes each chain-link converter to provide a stepped variable voltage source, which permits the generation of a voltage waveform across each chain-link converter using a step-wise approximation. Hence, the module switching elements 46 in each limb portion 30,32 are switchable to selectively permit and inhibit flow of current through the corresponding capacitor 48 in order to control a voltage across the corresponding limb portion 30,32.

It is envisaged that, in other embodiments of the invention, each module 44 may be replaced by another type of module which includes at least one switching element and at least one energy storage device, the or each switching element and the or each energy storage device in each such module arranged to be combinable to selectively provide a voltage source.

It is also envisaged that, in other embodiments of the invention, the capacitor 48 in each module 44 may be replaced by another type of energy storage device which is capable of storing and releasing energy to provide a voltage, e.g. a battery or a fuel cell.

The voltage source converter further includes a controller 50 configured, e.g. programmed, to control the switching of the module switching elements 46.

For the purposes of simplicity, the controller 50 is exemplarily described with reference to its implementation as a single control unit. In other embodiments, the controller 50 may be implemented as a plurality of control units. The configuration of the controller 50 may vary depending on specific requirements of the voltage source converter 20. For example, the controller 50 may include a plurality of control units, each of which is configured to control the switching of the module switching elements 46 of a respective one of the modules 44. Each control unit may be configured to be internal to, or external of, the corresponding module 44. Alternatively, the controller may include a combination of one or more control units internal to the corresponding module 44 and one or more control units external of the corresponding module 44. Each control unit may be configured to communicate with at least one other control unit via telecommunications links.

Operation of the voltage source converter 20 is described as follows with reference to FIGS. 4 to 9.

In order to transfer power between the DC and AC networks 36,40, the controller 50 controls the switching of the module switching elements 46 of the modules 44 to switch the capacitors 48 of the respective limb portions 30,32 into and out of circuit between the respective DC and AC terminals 24,26,34 to interconnect the DC and AC networks 36,40. The controller 50 switches the module switching elements 46 of the modules 44 of each limb portion 30,32 to provide a stepped variable voltage source between the respective DC and AC terminals 24,26,34 and thereby generate a voltage waveform so as to control the configuration of an AC voltage waveform at the corresponding AC terminal 34 to facilitate the transfer of power between the DC and AC networks 36,40.

Under certain circumstances, access to the voltage source converter 20 may be required to, for example, carry out maintenance or repair. The storage of charge in the capacitors 48 results in each limb portion presenting an overall voltage of 10's or 100's of kV that is dangerous to anyone approaching the voltage source converter 20. It is therefore necessary to first discharge the capacitors 48 and then verify the absence of voltage on the terminals of the capacitors 48 before permitting an operator to approach the voltage source converter 20. Without verification of the absence of voltage on the terminals of the capacitors 48, the operator approaching the voltage source converter 20 faces the risk of electric shock due to an incomplete discharge of a capacitor 48 or a recharging of a capacitor 48 that was previously verified as being discharged.

Figure 4:
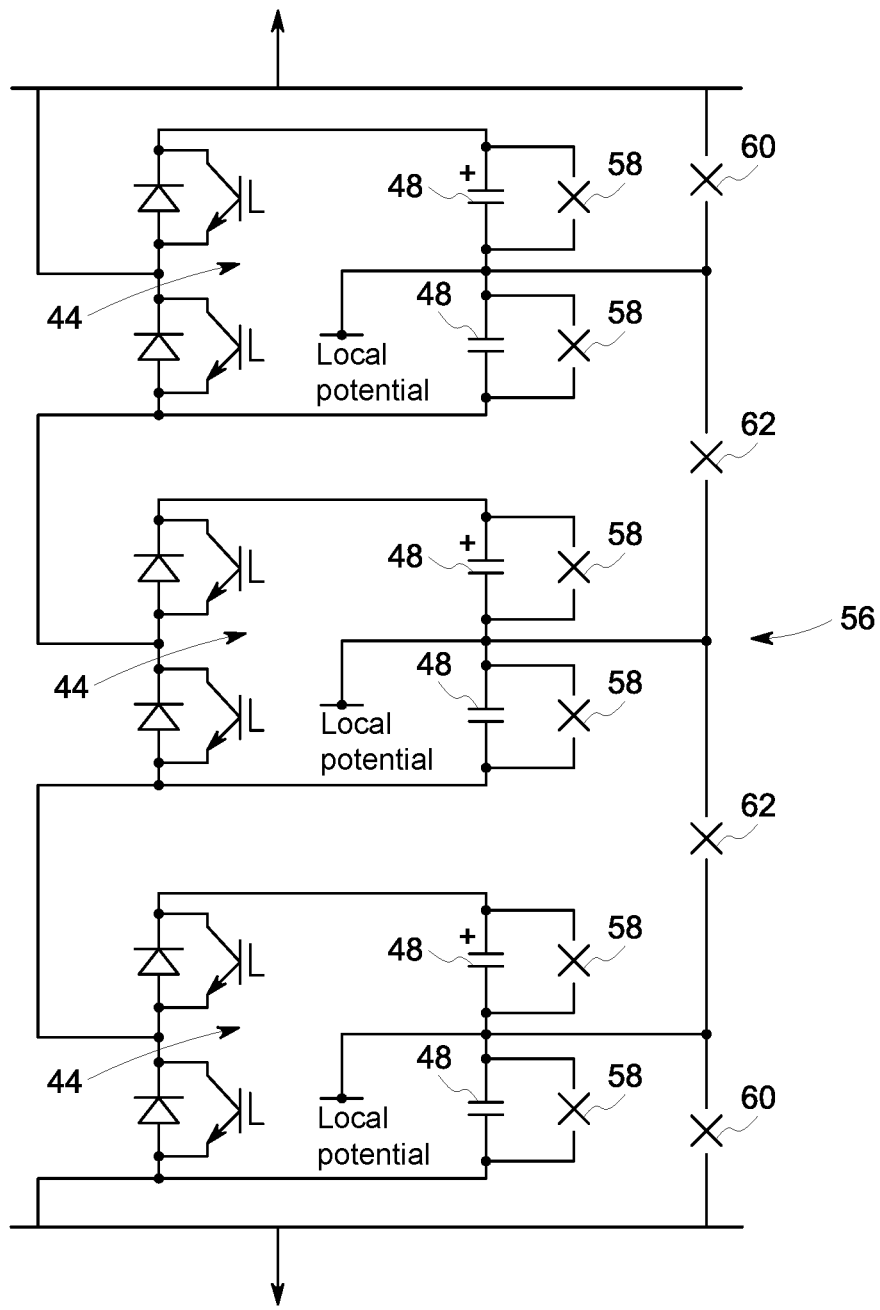
FIG. 4 shows a first exemplary configuration of a plurality of series-connected modules of the voltage source converter of FIG. 1.

FIG. 4 shows a first exemplary configuration of a plurality of series-connected modules 44 that forms part of a limb portion 30,32 of the voltage source converter 20.

Each module 44 is configured as a half-bridge module 44a as described above but with a pair of series-connected capacitors 48 in place of the single capacitor 48. For each module 44, the module switching elements 46 are arranged in a switching block that is removably disengageable from the module 44 so that each capacitor 48 is left in an electrical floating state with respect to the rest of the module structure. The modules 44 are supported and housed by a structural frame 52. Each module 44 includes a chassis 54 that is configured to house the corresponding capacitors 48.

The voltage source converter 20 comprises a shorting device 56 that comprises a plurality of first shorting switching elements, a plurality of second shorting switching elements and a plurality of third shorting switching elements. In the embodiment shown, each shorting switching element is a mechanical switching element but may take the form of an electrical, electronic or vacuum switching element in other embodiments.

Figure 5:
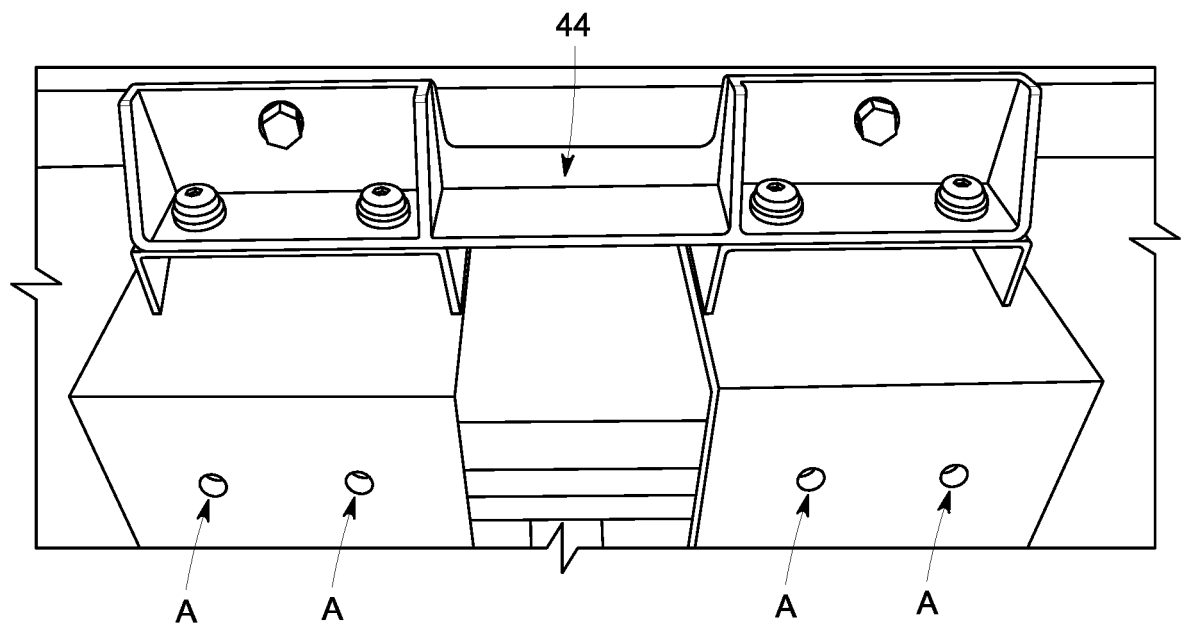
FIGS. 5 to 7 illustrate connecting position for capacitor, frame and link shorting switching elements in the voltage source converter of FIG. 1.

Each first shorting switching element is referred to hereon as a capacitor shorting switching element 58. Each capacitor shorting switching element 58 is directly connected to first and second terminals of a respective one of the capacitors 48, where the first and second terminals of each capacitor 48 are physically accessible from the exterior of the module 44. An example of such a connection is shown in FIG. 5 in which the arrows marked as 'A' indicate the connecting positions of the capacitor shorting switching elements 58. Each capacitor shorting switching element 58 is switchable between: a first switching state to isolate the first and second terminals from each other; and a second switching state to form a short circuit path that electrically connects the first and second terminals to short the capacitor 48.

In each module 44, one of the first and second terminals of each capacitor 48 is electrically connected, e.g. using a bonding strap, to the chassis 54.

Each second shorting switching element is referred to hereon as a frame shorting switching element 60, and each third shorting switching element is referred to hereon as a link shorting switching element 62.

Figure 6:
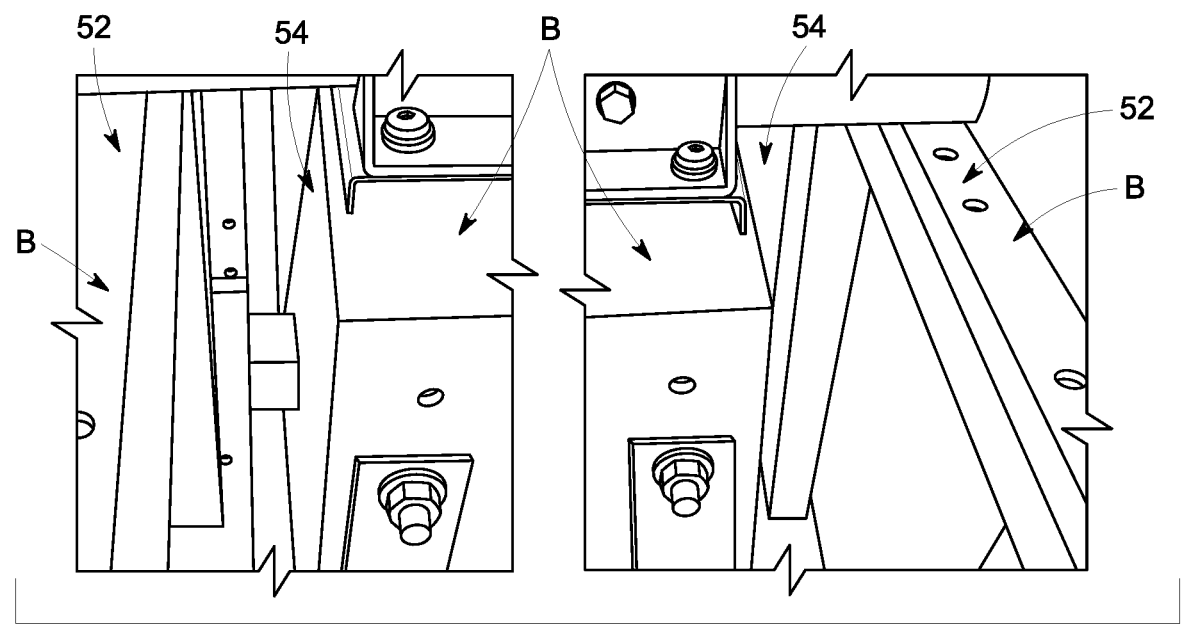

Each frame shorting switching element 60 is configured to connect the chassis 54 of a respective end module 44 of the series-connected modules 44 to the structural frame 52. An example of such a connection is shown in FIG. 6 in which the arrows marked as 'B' indicate the structural frame 52 and the chassis 54 of the end modules 44 that are to be bonded together by the frame shorting switching elements 60. Each frame shorting switching element 60 is switchable between: a first switching state to electrically isolate the chassis 54 of the end module 44 from the structural frame 52; and a second switching state to electrically connect the chassis 54 of the end module 44 to the structural frame 52.

Figure 7:
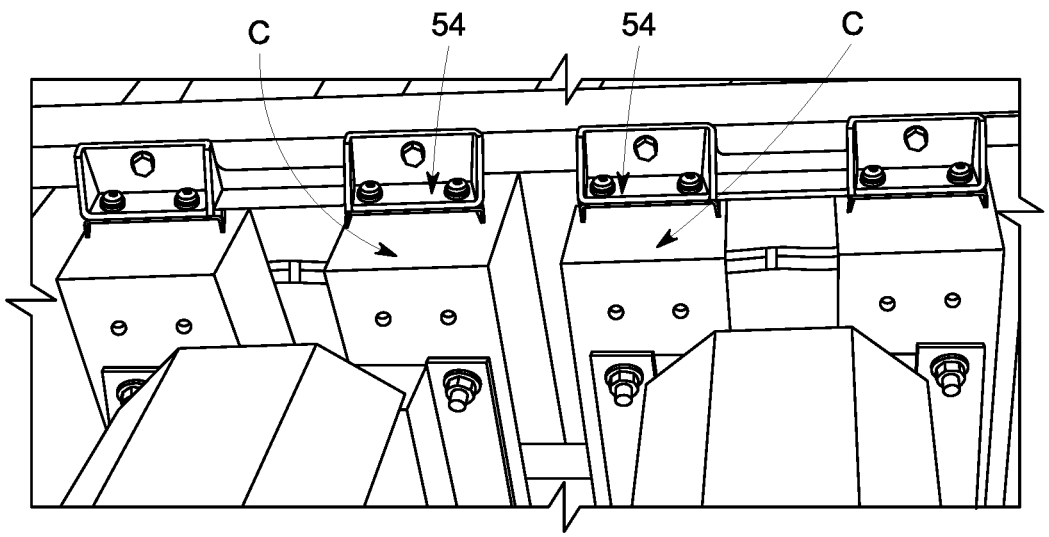

Each link shorting switching element 62 is configured to connect the chassis 54 of neighbouring modules 44. An example of such a connection is shown in FIG. 7 in which the arrows marked as 'C' indicate the chassis 54 of neighbouring modules 44 that are to be bonded together by a link shorting switching element 62. Each link shorting switching element 62 is switchable between: a first switching state to electrically isolate the chassis 54 of the modules 44; and a second switching state to electrically connect the chassis 54 of the modules 44.

In this way the frame and link shorting switching elements 62 are able to selectively connect the capacitors 48 of all of the modules 44 to the earthed structural frame 52.

Figure 8:
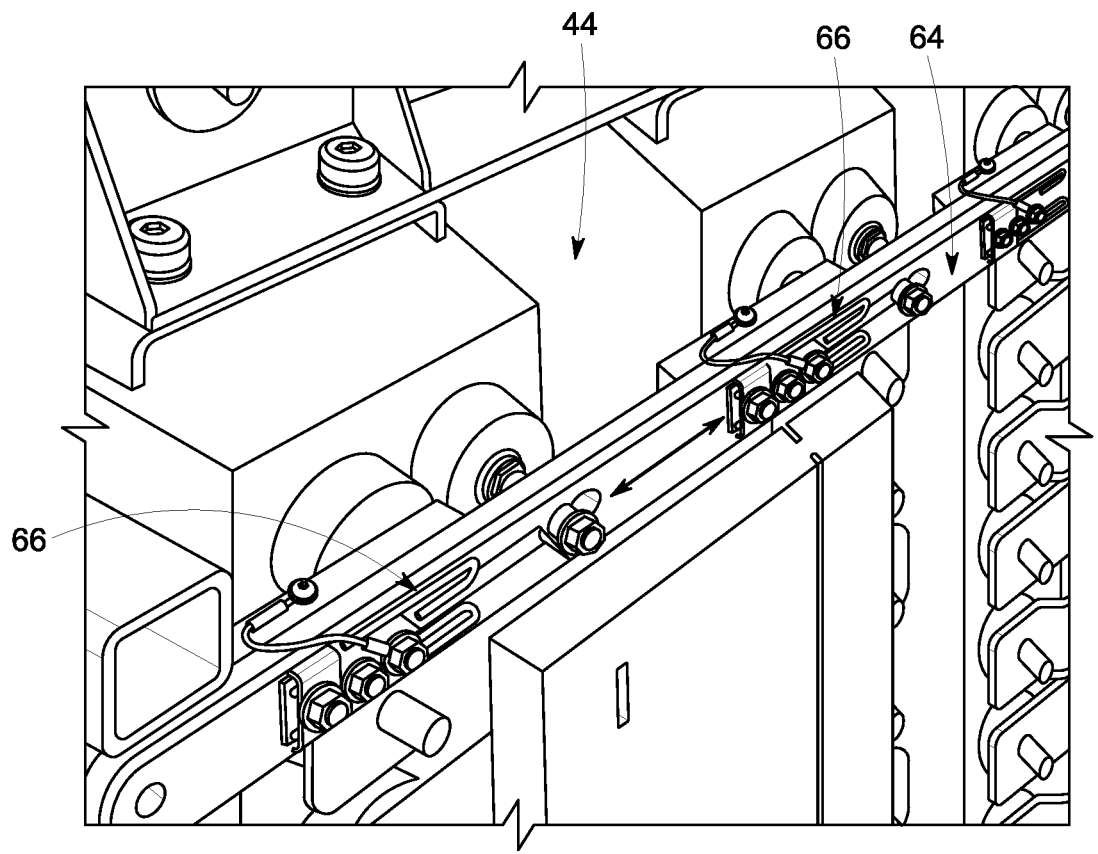
FIG. 8 shows a support bar of the voltage source converter of FIG. 1.

The shorting device 56 further includes a support longitudinal member, which is in the form of a support bar 64 but may take the form of a rod or beam in other embodiments. FIG. 8 shows the structure of the support bar 64.

The support bar 64 is made of fibreglass but may be made of another insulating material in other embodiments. The support bar 64 includes a plurality of longitudinal slots that are spaced apart from each other and have coaxially aligned longitudinal axes. An electrical terminal of each capacitor 48 is configured to project through a respective longitudinal slot in the support bar 64 so that the electrical terminal is slidable within the longitudinal slot.

Each shorting switching element includes a respective switch contact member 66 that is mounted on the support longitudinal member. More specifically, each switch contact member 66 is mounted at one end of a respective one of the longitudinal slots. Each switch contact member 66 includes two contact member limbs arranged to be spaced apart to receive the projecting electrical terminal. The mounting of the switch contact member 66 at the end of the longitudinal slot enables the longitudinal slot to guide a sliding movement of the electrical terminal into and out of contact with the switch contact member 66. The contact member limbs are arranged on opposing sides of the electrical terminal when the two contact member limbs receive the electrical terminal portion. Furthermore, each switch contact member 66 is shaped to have a resilient spring configuration in order to urge the contact member limbs towards the electrical terminal portion when the two contact member limbs receive the electrical terminal.

The sliding motion of the support bar 64 is carried out using one or more actuators (e.g. a hydraulic or pneumatic actuator) operably coupled to the end or both ends of the support bar 64. More specifically, the or each actuator is remotely operable to selectively apply a driving force to the support bar 64 so as to facilitate a sliding motion of the support bar 64 between first and second positions.

In the first position of the support bar 64, each shorting switching element is configured in its first switching state due to each switching contact member being physically separated and thereby electrically isolated from the corresponding electrical terminal. By sliding the support bar 64 from the first position to a second position, each switch contact member 66 is brought into contact with the corresponding electrical terminal in order to close the capacitor, link and frame shorting switching elements 60 and thereby facilitate the simultaneous shorting and earthing of all of the capacitors 48.

The shorting device of the invention is applicable to other module configurations and arrangements.

Figure 9:
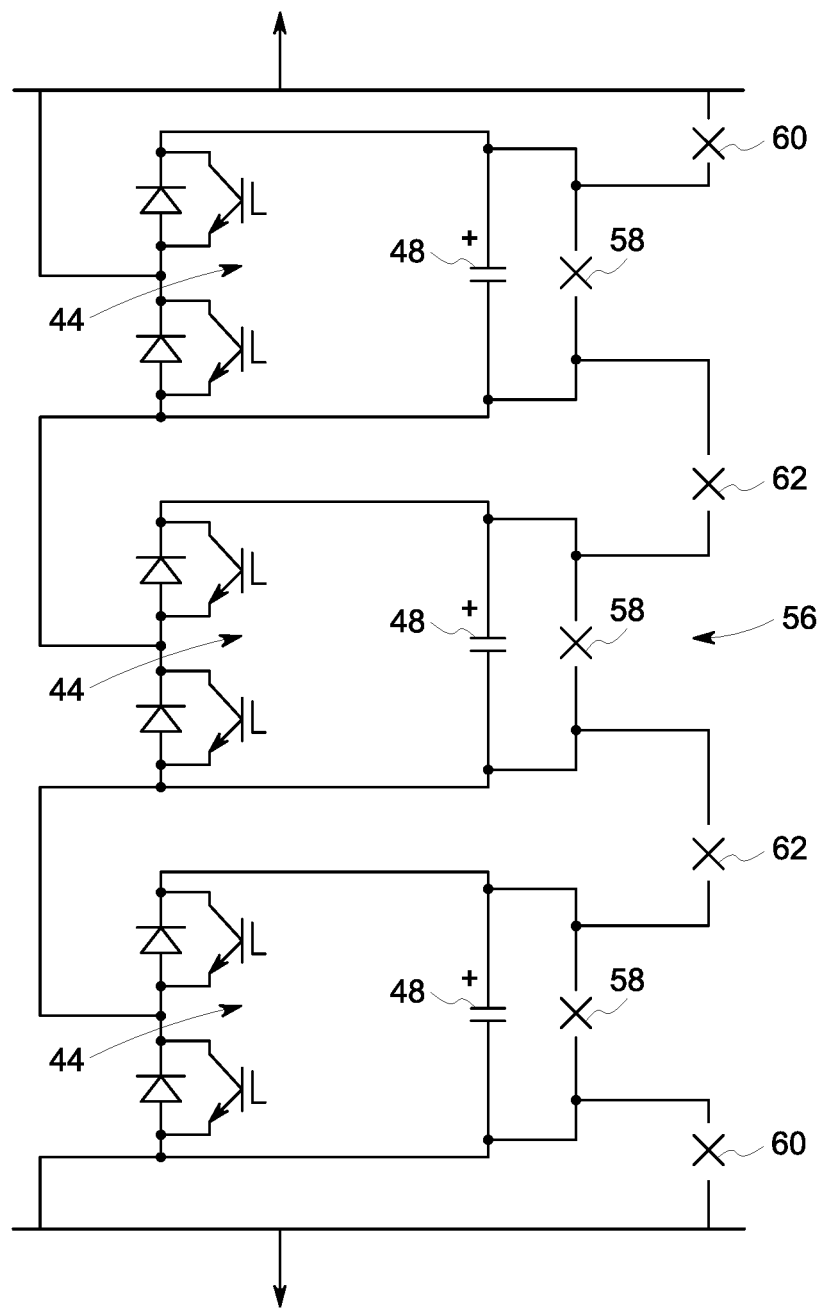
FIG. 9 shows a second exemplary configuration of a plurality of series-connected modules of the voltage source converter of FIG. 1.

FIG. 9 shows a second exemplary configuration of a plurality of series-connected modules 44 that forms part of a limb portion 30,32 of the voltage source converter 20. The second exemplary configuration of FIG. 5 is similar in structure and operation to the first exemplary configuration of FIG. 4 except that each module 44 is configured as a half-bridge module 44a with a single capacitor 48 and one of the first and second terminals of the single capacitor 48 is electrically connected, e.g. using a bonding strap, to the chassis 54.

The configuration of the shorting device 56 therefore not only enables the short circuiting and earthing of each capacitor 44 in order to avoid the situation where one or more individual capacitors 48 are unearthed and remain charged or is recharged, but also permits the physical removal of the switching block from each module 44 without interfering with the shorting and earthing of the capacitors 48 due to the shorting device 56 remaining intact and connected to the capacitors 48 even when the switching block is removed from each module 44.

Since each of the shorting switching elements are accessible and visible outwardly of the modules 44, an operator is able to visually verify the electrical continuity of each short circuit path across the terminals of each capacitor 48, and thereby visually verify the absence of voltage on the terminals of each capacitor 48, from a safe distance. The provision of the support bar 64 sliding between different positions to open or close the shorting switching elements also aids the visual verification by the operator.

Configuring the short circuit path to be selectively formable independently of the rest of the module structure ensures that the shorting device 56 is always capable of physically accessing the terminals of the capacitor 48, even when there is a physical or electrical fault in the rest of the module structure. As a result, verification of the absence of voltage on the terminals of the capacitor 48 is always possible irrespective of whether the capacitor 48 is electrically connected to or disconnected from the rest of the module structure.

Hence, the invention provides the operator with certainty of a complete discharge of the capacitors 44. This helps the operator reliably and quickly complete the process of verifying the absence of voltage on the terminals of the capacitors 44, which is beneficial in terms of electrical safety and speeding up the process of accessing the voltage source converter 20.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. An electrical assembly comprising:
a first energy storage device;
a second energy storage device;
a module including at least one module switching element and the first energy storage device, the or each module switching element and the first energy storage device in the module arranged to be combinable to selectively provide a voltage source; and
a shorting device directly connected to first and second terminals of the first energy storage device and to first and second terminals of the second energy storage device, the shorting device including a first shorting switching element configured to be switchable between: a first switching state to isolate the first and second terminals of the first energy storage device from each other; and a second switching state to electrically connect the first and second terminals of the first energy storage device to short the first energy storage device while isolating the first and second terminals of the second energy storage device from each other.

2. The electrical assembly according to claim 1 wherein one of the first and second terminals of the first energy storage device is electrically connectable to a grounding terminal for electrical connection to ground.

3. The electrical assembly according to claim 1 wherein the module includes a chassis that supports or houses the first energy storage device, and one of the first and second terminals of the first energy storage device is electrically connected to the chassis.

4. The electrical assembly according to claim 3 wherein the module includes a plurality of energy storage devices, the or each module switching element and each energy storage device in the module arranged to be combinable to selectively provide a voltage source, and one of the first and second terminals of each of the plurality of energy storage devices is electrically connected to the chassis.

5. The electrical assembly according to claim 1 including a structural element configured to support and/or enclose the module, the shorting device including a second shorting switching element configured to connect a selected one of the first and second terminals of the first energy storage device to the structural element, the second shorting switching element configured to be switchable between: a first switching state to electrically isolate the selected terminal of the first energy storage device from the structural element; and a second switching state to electrically connect the selected terminal of the first energy storage device to the structural element.

6. The electrical assembly according to claim 5 wherein the structural element is or includes a frame, a rack, a shelf or a cage.

7. The electrical assembly according to claim 1 including a plurality of modules, wherein a second module of the plurality of modules comprises the second energy storage device, the shorting device including a third shorting switching element configured to connect a selected one of the first and second terminals of the energy storage device of one of the plurality of modules to a selected one of the first and second terminals of the second energy storage device of the second module, the third shorting switching element configured to be switchable between: a first switching state to electrically isolate the selected terminals of the energy storage devices of the plurality of modules and a second switching state to electrically connect the selected terminals of the energy storage devices of the plurality of modules.

8. The electrical assembly according to claim 7 wherein the third shorting switching element is configured to connect the chassis of different modules.

9. The electrical assembly according to claim 1 wherein the shorting device includes a support longitudinal member, the or each shorting switching element including a switch contact member, the or each switch contact member arranged in or on the support longitudinal member, wherein the support longitudinal member is configured to be slidable to move the or each switch contact member to switch the or each shorting switching element between its first and second switching states.

10. The electrical assembly according to claim 1 wherein the or each module switching element is arranged in a switching block that is removably disengageable from the module.

11. The electrical assembly according to any claim 1 wherein the shorting device is accessible and/or visible outwardly of the module.

12. The electrical assembly according to claim 1 wherein the first energy storage device is or includes a capacitor.

13. A switching valve comprising an electrical assembly according to claim 1.

14. A voltage source converter comprising an electrical assembly according to claim 1.

* * * * *